Patented Nov. 11, 1924.

1,515,001

UNITED STATES PATENT OFFICE.

CONWAY VON GIRSEWALD AND HANS WEIDMANN, OF FRANKFORT-ON-THE-MAIN, GERMANY, ASSIGNORS TO AMERICAN LURGI CORPORATION, OF NEW YORK, N. Y., A CORPORATION OF NEW YORK.

PROCESS FOR OBTAINING LITHIUM SALTS OR METALLIC LITHIUM.

No Drawing.   Application filed April 19, 1923.   Serial No. 633,319.

*To all whom it may concern:*

Be it known that we, Dr. CONWAY VON GIRSEWALD and Dr. HANS WEIDMANN, both citizens of the German Republic, and both residing at Frankfort-on-the-Main, Germany, have invented certain new and useful Improvements in Processes for Obtaining Lithium Salts or Metallic Lithium, of which the following is a specification.

This invention relates to the production of lithium and its compounds and involves the separation of the lithium by taking advantage of the relatively low solubility of its fluoride.

In treating lithium-containing minerals for the recovery of lithium, there is ordinarily obtained a solution in which the several alkalis are in the form of sulphates or chlorides. Heretofore, the usual procedure in separating the lithium has been by utilizing the low solubility of the carbonate or phosphate of lithium and it is a necessary condition in such processes that the solution to be treated should be entirely free from the alkaline earths and magnesium, inasmuch as these elements also produce carbonates and phosphates of low solubility. This makes it difficult to recover lithium products in the desired degree of purity.

Another method of separation of the lithium is to transform all the salts of the solution into chlorides which are then dried by evaporation. Lithium chloride is then obtainable by the use of different organic solvents such as isopropyl alcohol, ether, and the like, which dissolve the lithium chloride readily but in which the chlorides of the other alkalis are not readily soluble.

There are various incidental disadvantages in the methods above briefly referred to, which may be overcome by producing the lithium in the form of the fluoride. Such a step includes, among others, the advantages of producing a lithium salt which is considerably more insoluble than the carbonate, a matter of special importance where the lyes treated contain potassium sulphate. Furthermore, the fluoride may be recovered in a more nearly pure state, than by the use of the phosphate, which has a tendency to retain other alkaline salts mixed with it. The chief advantage is, however, that the lyes from which the lithium is to be separated need not be carefully treated to get rid of calcium, magnesium and other similar salts before the precipitation of the lithium.

While the fluoride of lithium is in itself a product which is not in commercial demand, still it may be readily transformed into other easily soluble lithium salts simply by causing it to react with the corresponding salts of metals, which yield fluorides of a higher degree of insolubility than the lithium itself. Accordingly it will be seen that the presence of calcium, magnesium and other similar impurities in the lye is not detrimental, since their fluorides take no part in the reaction by which the lithium fluoride is converted into a soluble lithium compound.

From the foregoing, it will be clear that the present process for the production of lithium, which involves the intermediate step of producing lithium fluoride has these several advantages:

(1) The lithium is more completely precipitated and its fluoride may be much more easily washed;

(2) The preparation of the solution from which the lithium is to be recovered is much simplified since the presence of small amounts of alkaline earth salts such as gypsum or magnesium sulphate does not reduce the purity of the lithium salts; and (3) In the use of organic solvents, the transformation of the sulphates into the chlorides may be dispensed with.

In connection with the conversion of the lithium fluoride into lithium compounds which are more readily soluble, it has been found that the incidental reactions may be carried on not only in aqueous solution, but much more easily by fusion. It is preferable to use the latter process where calcium salts are involved, since its aqueous solutions calcium fluoride precipitates in the form of slime difficult to filter. In the fusion operation, on the contrary, the calcium fluoride forms as crystals which are easily removed.

Inasmuch as almost all organic and inorganic lithium salts are readily soluble and fusible, the present process will be seen to be of wide application and the lithium may be recovered in the desired form as a salt or as the oxide. The latter is produced from the fluoride by melting it with calcium oxide and adding calcium carbonate as a flux. The reaction is quantitative in results and is effected easily because the melting point of the mixture is considerably lower than that of the single components. For example, the chloride of lithium melts at 602° C., but the melting point of a mixture containing 4 molecules of lithium chloride and 1 molecule of calcium fluoride is 472° C.

The new process may also be used in connection with the electrolytic separation of metallic lithium. In the electrolytic production of the metal as hitherto carried on, the chloride of lithium is used since the fluoride has too high a melting point for such purposes. If the fluoride were to be used there would always be some danger of oxidizing the metal in contact with the atmosphere or else volatilizing it, but when the fluoride is melted in a mixture with the salts of metals which form soluble fluorides of greater insolubility, then this fusion may be used for the electrolytic production of the metal. The lithium chloride formed in the fusion has but little effect in dissolving the calcium fluoride simultaneously produced and, as the chloride of lithium is used up during the electrolysis, a corresponding amount of solid fluor spar is precipitated in the melt. Accordingly the mass retains its original composition and melting point. Also, by the addition of potassium chloride or other salts in suitable amounts, the melting point of the mass may be further lowered, if desired, without danger of contaminating the metallic lithium with potassium or calcium.

By way of illustration of the manner of using the improved process, a series of examples will be given.

Suppose the solution from which the lithium is to be recovered contains per liter, 110 gr. of lithium sulphate and a somewhat larger amount of potassium sulphate left from the raw material, and is saturated with gypsum. This solution is then filtered and about 120 gr. of pure fluoride of potassium in the solid form is added. Subsequent heating, preferably to the boiling point, results in the precipitation of lithium fluoride in the crystalline form, which is easily filtered out and washed. The resulting product is a mixture of the fluorides of lithium and calcium (produced from the gypsum present) and the weight of the calcium fluoride is 51.2 gr. and of the lithium fluoride 51.7 gr. (theor. 52 gr.). The mother lye remaining may then be treated in the usual way to recover potassium sulphate.

Having thus secured lithium as a fluoride, the next step is to convert it into a soluble salt, such as lithium sulphate. For this purpose, the precipitate previously obtained and still wet is suspended in about ½ litre of water, into which about 170 gr. of gypsum are added to digest while being stirred. The lithium fluoride is thus quantitatively converted into the sulphate which may be separated by evaporating the solution. The calcium fluoride present in the precipitate remains unchanged and settles as a slime which may be readily removed. Or if desired, the lithium sulphate in solution is decanted off. In either event, the calcium fluoride may be subsequently treated in the usual manner for obtaining hydrofluoric acid or potassium fluoride.

As an alternative method for the conversion of the lithium fluoride to the final product, it is possible to make use of a fusion process. For this purpose, the fluorides first obtained as a precipitate are dried and fused with a substantially equal amount (110 gr.) of calcium chloride, the melting point of the mixture being about 472° C. At this temperature about half of the fluoride of calcium formed is precipitated out of the melt in the solid state. The chloride of lithium is then recovered by leaching the mass with hot water, and this recovery is quantitative.

Should it be desired to produce metallic lithium by electrolysis, it is advisable to separate the precipitated fluor spar from the molten product as above described in connection with the fusion process. After this separation, a quantity of potassium chloride of about the same weight as the lithium chloride present, is added, whereupon the melting point will be lowered to 340° C. This bath is then electrolyzed in the usual manner, and the deposited metal will be found to have a high degree of purity.

We claim:

1. A process for the production of lithium or its compounds which comprises preparing a solution containing lithium, precipitating the lithium therefrom in the form of a fluoride, and separating the precipitate.

2. A process for the production of lithium or its compounds which comprises preparing a solution containing lithium, precipitating the lithium therefrom in the form of a fluoride, separating the precipitate and causing the lithium fluoride in the precipitate to react with a compound of a metal capable of forming a fluoride of lower solubility than lithium fluoride.

3. A process for the production of lithium or its compounds which comprises preparing a solution containing lithium, adding a soluble fluoride thereto and separating the precipitated fluorides.

4. A process for the production of lithium or its compounds which comprises preparing a solution containing lithium, precipitating the lithium therefrom in the form of a fluoride, and heating the precipitate with a compound of a metal capable of forming a fluoride of lower solubility than lithium fluoride.

5. A process for the production of lithium or its compounds which comprises preparing a solution containing lithium, precipitating the lithium therefrom in the form of a fluoride, separating the precipitate and heating the precipitate with calcium chloride.

6. A process for the production of lithium or its compounds which comprises preparing a solution containing lithium, precipitating the lithium therefrom in the form of a fluoride, separating the precipitate, and fusing the precipitate with a salt, containing an acid radical capable of combining with lithium to form a soluble salt.

7. A process for the production of lithium which comprises preparing a solution containing lithium, precipitating the lithium therefrom in the form of a fluoride, separating the precipitate, fusing the precipitate with a salt containing an acid radical with which the lithium forms a soluble salt, and subjecting the melt to electrolysis.

8. A process for the production of lithium which comprises preparing a solution containing lithium, precipitating the lithium therefrom in the form of a fluoride, separating the precipitate, fusing the precipitate with a salt containing an acid radical with which the lithium forms a soluble salt, adding a substance soluble in the melt and subjecting the melt to electrolysis.

9. A process for the production of lithium or its compounds which comprises treating a lithium-containing mineral to form a solution, precipitating the lithium therefrom in the form of a fluoride and separating the precipitate.

10. A process for the production of lithium which comprises preparing a solution containing lithium, precipitating the lithium therefrom in the form of a fluoride, separating the precipitate, fusing the precipitate with a salt containing an acid radical with which lithium forms a soluble salt, separating the melt from solid matter, adding to the separated melt a substance capable of reducing its fusion temperature, and electrolyzing the molten mass to deposit metallic lithium.

11. A process for the production of lithium which comprises fusing lithium fluoride with a salt of a metal capable of forming a fluoride of less solubility in the melt than lithium fluoride, and depositing the lithium from the melt by electrolysis.

12. A process for the production of lithium which comprises preparing from a lithium ore a solution containing soluble salts of lithium and one or more alkaline earth metals, adding to the solution a soluble fluoride, separating the resulting precipitate, fusing the precipitate with calcium chloride, separating the resulting melt from unfused calcium fluoride, adding to the separated melt a compound capable of reducing its fusion temperature, electrolyzing the resulting melt and recovering metallic lithium.

13. A process for the production of lithium or its compounds which comprises preparing a solution containing lithium and an alkaline earth metal compound, adding to the solution a soluble fluoride, separating the resulting precipitate, and fusing the precipitate with an alkaline earth metal chloride.

14. A process for the production of lithium which comprises fusing a mixture comprising lithium fluoride and calcium fluoride with calcium chloride, and separating metallic lithium from the resulting melt by electrolysis.

In testimony whereof we affix our signatures in presence of two witnesses.

DR. CONWAY VON GIRSEWALD.
DR. HANS WEIDMANN.

Witnesses:
ROBERT ENGLER,
C. C. L. B. WYLES.